US012809990B2

(12) United States Patent
Tora

(10) Patent No.: US 12,809,990 B2
(45) Date of Patent: Nov. 24, 2026

(54) DETECTION OF SOFTWARE VULNERABILITIES UTILIZING PARALLEL LARGE-LANGUAGE MODELS

(71) Applicant: Saudi Arabian Oil Company, Dhahran (SA)

(72) Inventor: Hamidullah S. Tora, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 129 days.

(21) Appl. No.: 18/901,215

(22) Filed: Sep. 30, 2024

(65) Prior Publication Data

US 2026/0141076 A1 May 21, 2026

(51) Int. Cl.
*G06F 21/57* (2013.01)
*G06F 9/455* (2018.01)
*G06F 40/284* (2020.01)

(52) U.S. Cl.
CPC ............ *G06F 21/577* (2013.01); *G06F 9/455* (2013.01); *G06F 40/284* (2020.01); *G06F 2221/033* (2013.01)

(58) Field of Classification Search
CPC ...... G06F 21/577; G06F 40/284; G06F 9/455; G06F 2221/033; G06F 21/57
See application file for complete search history.

(56) References Cited

U.S. PATENT DOCUMENTS 8,776,026 B2 7/2014 Candea et al.
8,997,233 B2 3/2015 Green et al.
10,033,747 B1 7/2018 Paithane et al.
11,416,622 B2 8/2022 Sharma et al.
11,568,055 B2 1/2023 Olson et al.
12,307,247 B1 * 5/2025 Dziubinski ............ G06N 20/00
2012/0159629 A1 6/2012 Lee et al.
2012/0290848 A1 11/2012 Wang et al.
2015/0310212 A1 * 10/2015 Green .................. H04L 63/145 726/24
2019/0005239 A1 1/2019 Park et al.
2019/0132355 A1 * 5/2019 Egbert ................ H04L 63/1483
2021/0056211 A1 * 2/2021 Olson ...................... G06N 5/01
2022/0147629 A1 * 5/2022 Vasilenko ............ G06N 3/0499
2023/0325501 A1 10/2023 Chhetri et al.
(Continued)

FOREIGN PATENT DOCUMENTS

CN 117130645 11/2023
RU 2622627 6/2017
(Continued)

OTHER PUBLICATIONS

U.S. Appl. No. 18/827,044, filed Sep. 6, 2024, Tora.
(Continued)

*Primary Examiner* — Jayesh M Jhaveri
(74) *Attorney, Agent, or Firm* — Fish & Richardson P.C.

(57) ABSTRACT

A computer implemented method that enables detection of software vulnerabilities is described. The method includes emulating the execution of the one or more code samples to generate an extracted code representation. The extracted code representation is parsed using a language encoder model to generate a tokenized code representation. A transformer-based machine learning framework to identifies vulnerable functions using the tokenized code representation.

17 Claims, 4 Drawing Sheets

(56) References Cited

U.S. PATENT DOCUMENTS

| | | | | |
|---|---|---|---|---|
| 2024/0070275 | A1 | 2/2024 | Cirlig et al. | |
| 2024/0176869 | A1* | 5/2024 | Idrizovic | G06F 21/53 |
| 2024/0427993 | A1* | 12/2024 | Sahar | G06F 8/77 |
| 2025/0307418 | A1 | 10/2025 | Spencer et al. | |

FOREIGN PATENT DOCUMENTS

| | | | | |
|---|---|---|---|---|
| WO | WO-2025193812 | A1 * | 9/2025 | G06F 7/483 |
| WO | WO-2026019984 | A1 * | 1/2026 | G06N 5/022 |

OTHER PUBLICATIONS

Noever et al., "Chatbots as Fluent Polyglots: Revisiting Breakthrough Code Snippets," CoRR, arXiv:2301.03373, Submitted on Jan. 5, 2023, 20 pages.

Sahin, "Malware Detection Using Transformers-Based Model GPT-2," Thesis Submitted to The Graduate School of Informatics Institute of Middle East Technical University, Degree of Master of Science in Cyber Security, Nov. 2021, 78 pages.

* cited by examiner

DETECTION OF SOFTWARE VULNERABILITIES UTILIZING PARALLEL LARGE-LANGUAGE MODELS

TECHNICAL FIELD

This disclosure relates generally to cybersecurity, and more particularly to detection of software vulnerabilities utilizing parallel large-language models.

BACKGROUND

Software systems face threats from attackers who exploit vulnerabilities found in source code. Vulnerabilities include weaknesses or flaws in source code that can be used to gain unauthorized access to a software system, steal data from a software system, or disrupt operations of the software system. The vulnerabilities can go undetected and hinder development of a software system.

DETAILED DESCRIPTION

Figure 1:
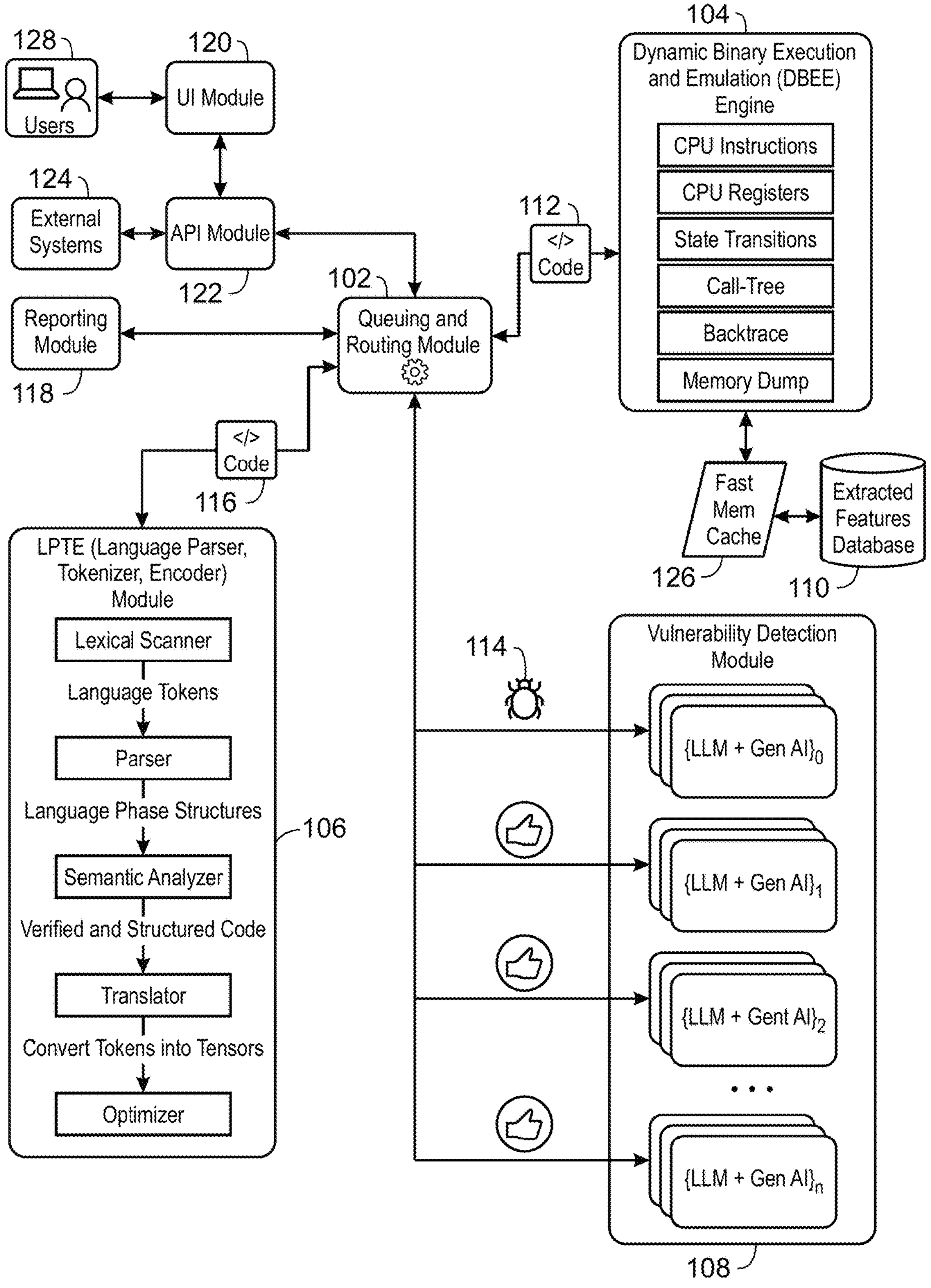
FIG. 1 shows an architecture/workflow that enables detection of software vulnerabilities utilizing machine learning.

Embodiments described herein relate to the detection of software vulnerabilities utilizing machine learning. The present systems and techniques include detecting vulnerable and exploitable source code instructions within software applications by utilizing parallel large language models (LLMs) and generative artificial intelligence (AI) to automate the process of identifying, deciphering, and highlighting potential regions of vulnerable instructions and code branches. The present systems and techniques analyze source code in order to identify potentially vulnerable and exploitable instructions and code branches (e.g., pointer de-references, race conditions, input and data validations, memory leaks, buffer overflows, process injections, covert channels, privilege violations, file inclusions, SQL injections, cross-site scripting (CSS), cross-site request forgery (CSRF), external entity (XXE) injection, server-side request forgery (SSRF), open re-directs, etc.) within software applications. Furthermore, the present systems and techniques include providing an alternative set of instructions to secure and harden the software application.

Traditional static or dynamic application security testing (SAST/DAST) utilize regular expression or heuristics to scan for vulnerabilities or use a dictionary of known vulnerabilities to fuzz an application. Additionally, traditional vulnerability detection systems rely on an identifier library to provide suggested auto completion of faulty code. For example, traditional identifier libraries rely on predefined patterns and signatures of known vulnerabilities. Traditional generative AI models use identifier libraries to scan source code and identify potential issues by matching code patterns against the known vulnerabilities. These traditional identifier libraries are limited, often outdated, and can fail to include new, emergent threats. As the number of identified vulnerabilities grows, managing and searching through large traditional identifier libraries is cumbersome and inefficient. Further, creating, maintaining, and updating traditional identifier libraries consumes significant resources, including time, organizational expertise, and organizational finances. Moreover, traditional identifier libraries often lack context-specific information associated with the source code. Assessment of the actual risk or impact of a vulnerability is challenging to determine with incomplete or limited context information.

The present systems and techniques use parallel large-language models to increase the efficacy and efficiency of detecting software vulnerabilities and generative AI to provide a secure alternative code to harden the code. Vulnerabilities are detected utilizing (1) dynamic emulation and extraction for thorough tracing, recording and logging of central processing unit (CPU) instructions, registers, system transitions, call-trees, execution back-trace and memory dump states for executables, and (2) a real-time language encoder to parse and tokenize all language constructs. The combination of the emulation, extraction, and language encoding enables the extraction of structural features and relations within the source code to enhance the detection capabilities of the LLMs to predict vulnerabilities in the code.

Some advantages of the present systems and techniques include an improved algorithm that uses parallel LLMs and generative AI to identify potentially vulnerable functions within software applications that have been compiled either statically or dynamically. The present systems and techniques utilize a hybrid approach to use a combination of decoder-only LLMs and encoder-decoder LLMs. The decoder-only LLMs and encoder-decoder LLMs execute in parallel at a large scale to increase the overall accuracy and efficiency of both analysis and code generation. To identify specific vulnerabilities, the LLMs utilize domain-specific pre-training on identified vulnerabilities for a specific weakness across parallel LLMs.

The present systems and techniques include an adversary testing component in which potential proof-of-concept exploit code is suggested in order to safely test the vulnerable code. Furthermore, the present systems and techniques enable analysis in multiple programming languages.

FIG. 1 shows a workflow 100 that enables detection of software vulnerabilities using machine learning. The workflow directly ingests either source code or a binary executable of the source code for analysis. The workflow automates the process of detecting software vulnerabilities within code by using parallel large language models and generative AI to generate one or more proof-of-concept exploits and corresponding alternative code to secure and mitigate the vulnerability, enabling security development operation analysts and penetration testers to properly identify, validate, test, and harden the software application.

In examples, a proof of concept exploit shows how a particular vulnerability can be exploited. The proof of concept exploit proves the existence of a vulnerability. Parallel LLMs are used to generate a proof-of-concept exploit by creating specific inputs or sequences of operations that trigger the identified vulnerability. Additionally, in examples generative AI models create alternative code to replace code associated with the identified vulnerability by determining a context of the code associated with the identified vulnerability, and recognizing patterns in the code associated with the identified vulnerability. In FIG. 1, multiple machine learning models are shown. Several machine learning models are trained to each generate an extracted code representation, a tokenized code representation, potential code vulnerabilities, and instructions to fix the code vulnerabilities.

A queuing module 102 is shown in FIG. 1. In examples, the queuing module 102 includes one or more queues, where data sent between modules of FIG. 1 is stored for routing or processing. In some embodiments, the queuing module 102 enables a centralized queueing and routing mechanism for which requests and data that are sent and received between other respective modules can be scheduled, coordinated, and processed in an efficient manner. In examples, the data is routed to a respective queue in a first-in, first out order.

One or more users 128 access a user interface (UI) module 120 of FIG. 1. The one or more users can be, for example, malware reverse engineers, application security analysts, or software developers who would utilize a graphical user interface (GUI) or command line interface (CLI) within the UI module 120 to view, highlight, and otherwise interact with all disassembled and decompiled static code, and symbol names and strings.

In examples, the UI module 120 renders a GUI or CLI with which the aforementioned one or more users 128 can interact with. Using the UI module 120, one or more users 128 are able to view and interact with disassembled and decompiled static code, such as the source code or corresponding binary executable. The disassembled and decompiled static code is viewed concurrently with the generated output from a Dynamic Binary Execution and Emulation (DBEE) module 104 to view dynamic execution details associated with the code, including CPU instructions, changes in CPU registers, system state transitions, system call trees, trace logs, and process changes in memory.

An application programming interface (API) Module 122 provides mechanisms and private functions that the one or more users 128 can invoke via the UI module 128 to access internal server data and public and partner functions which can be used to integrate with external systems 124. In examples, the external systems 124 refer to systems of a cybersecurity framework. For example, the external systems include Security Information and Event Management (SIEM) systems, Security Orchestration, Automation, and Response (SOAR) systems, and Integrated Development Environments (IDEs). External systems such as SIEMs are event logging, correlation, and alerting systems that are monitored by security operations center (SOC) analysts for incident response and forensic analysis. Other external systems like SOAR are used for orchestration, automation of security events. Moreover, IDEs represent development environments where the code to be analyzed is displayed and relevant portions that may contain security vulnerabilities are highlighted.

In some embodiments, an IDE provides real-time feedback on potential security issues as code is written. IDEs integrate with other systems to automatically scan code for vulnerabilities. In some embodiments, a SIEM system obtains and analyzes security data from various sources, such as network devices, servers, and applications. In examples, the security data includes log files, network traffic data, endpoint data, user activity, application data, and the like. The SIEM system identifies potential threats and generate alerts based on the security data. The SIEM system enables real-time monitoring and correlation of security events. In some embodiments, a SOAR system automates security tasks and orchestrates responses to security events. For example, a SOAR system can automate log analysis, validate security alerts, and manage responses to alerts. In response to a security event, a SOAR system integrates with an SIEM system to automatically respond to alerts generated by the SIEM system. In examples, code is written within an IDE, and SIEM systems continuously monitor the environment, collecting and analyzing data to detect potential threats. When a SIEM system detects an anomaly and generates an alert, a SOAR systems automatically orchestrates and executes a response.

A reporting module 118 generates events, alerts, and reports that can be further utilized to create various dashboards to contextualize and visualize the reported data to be used by security analysts, system administrators both internally and with external systems 124 for security event logging and incident response activity.

As shown in the example of FIG. 1, code samples 112 are routed from the queuing and routing module 102 to the DBEE module 104. In examples, the DBEE module 104 includes machine learning models trained to generate an extracted code representation. Code samples are input to the machine learning models of the DBEE module 104, and the machine learning models of the DBEE module 104 outputs features associated with the code. In some embodiments, the code samples 112 are, for example, a compiled binary executable file (i.e., Win32/64 PE, MACH-O, ELF, etc.). The DBEE module 104 emulates the execution of the one or more code samples in order to trace, extract, and log data associated with the code. In examples, the data associated with the code enables an understanding of the behavior of the code. The data associated with the code includes, for example, CPU instructions, CPU registers, state transitions, function calls, symbol names, memory dumps (stack/heap), call-trees, and back-trace of all transitions. In examples, CPU instructions are commands executed by a CPU to perform operations. CPU instructions are emulated to identify malicious or unexpected behaviors of the code. Further, the sequence of CPU instructions can be used to determine a location of vulnerabilities within the code. In examples, CPU registers are storage devices with a CPU that store data, instructions, and a status of the CPU. The CPU registers are emulated to identify malicious or unexpected behaviors of the code. For example, buffer overflows, where data written to a register exceeds its capacity, can indicate a vulnerability in the code.

In examples, function calls are emulated to identify malicious or unexpected behaviors of the code. For example, emulated function calls that result in improper error handling can indicate a vulnerability. Additionally, emulation of function calls identifies potential injection point by analyzing the data flow of function calls to detect anomalies and potential vulnerabilities. Emulation can be used to identify vulnerabilities in symbol names in code, such as such as variable names, function names, and class names. Emulations of memory dumps, including contents of the stack and heap areas of memory, are analyzed to identify vulnerabilities that cause or stem from buffer overflows, use-after-free errors, and memory leaks. Similarly, paths in emulated call trees are used to identify vulnerabilities based on how data flows through the code according to the call trees. In examples, unintended or unexpected function calls in a call tree can indicate potential vulnerabilities. Further, backtracing of transitions can be used to identify vulnerabilities. In examples, transitions refer to changes in state or events during the emulation of code. Backtracing follows the transitions from a point of failure or vulnerability back to the origin.

In some embodiments, the DBEE module stores the traced, extracted, or logged data associated with the code or generated features in an extracted features database 110. A fast memory cache 126 provides a high-speed memory within or adjacent to the CPU to store frequently accessed data to significantly increase read operations and avoid having to perform redundant operations from the local database. In examples, the fast memory cache 126 can store frequently accessed data generated by the DBEE module.

In implementations, the code samples are provided in the form of a binary executable. The DBEE module extracts binary data 112 by emulating the execution of the software application to enable tracing, recording, and logging all CPU instructions, CPU register states, code branches and call-trees, back-trace, and memory dumps (stack/heap) which can be saved into a predetermined tracing format that can be read and/or replayed in the future. As a result, the binary code is fully disassembled and decompiled to obtain the raw opcodes, symbol names, and software language (PE/ELF) artifacts. In some embodiments, the predetermined tracing format is a data structure that includes a sequential record of CPU instructions executed during emulation, memory accesses during emulation including reads and writes to the stack and the heap, the CPU register state during emulation, a log of function calls and function returns, a log of system calls, and the like. The logged and recorded data is stored in log files and trace databases in the extracted features database 110.

A language parser, tokenizer, encoder (LPTE) module 106 obtains the feature or traced, extracted, or logged data associated with the code from the extracted features database and decompiled code samples 116. The decompiled code samples include static code. In examples, the data from the extracted features database is obtained in a predetermined tracing format that includes all logged CPU instructions, CPU register states, code branches, calls-trees, back-trace, and stack/heap states. In examples, the LPTE module 106 includes machine learning models trained to generate a tokenized code representation. Features are input to the machine learning models of the LPTE module 106, and the machine learning models of the LPTE module 106 outputs an optimized tensor associated with the code.

A lexical scanner of the LPTE module 106 generates language tokens based on input including the data from the extracted features database and the decompiled code samples 116. Language tokens are generated by dividing the given input into separate tokens and defining boundaries based on predefined categories, including reserved keywords, operators, literals, variables, constants, and punctuation. The tokens can be a grouping of specific character sequences for special reserved keywords, operators, identifiers, or other elements that have a specific syntactical role in the source programing language.

A parser of the LPTE module 106 parses the language tokens to generate language phrase structures. In examples, the parser parses relevant code to create a language-aware reliable tokenization stream based on a common language (e.g., C, C++, .NET, Go, Python, Rust) API function names, keywords, and language syntax.

A semantic analyzer of the LPTE module 106 uses an encoder and an analyzer to generate verified and structured code. The encoder can be multiple (8, 16, or 32) stacked layers that can grow linearly based on the length of the given input stream. The encoder tokenizes the data from the input stream and converts them into fixed size vectors of size 512, 1024, or 2048 depending on the size of the original input stream. The analyzer examines the semantics of code, as in the use of valid expressions, statements, and other programming units, to determine that the code is verified and structured according to structured programming principles. This is accomplished by using a self-attention mathematical technique. The analyzer analyzes the degree to which different tokens are related to each other by assigning a score matrix to determine the degree of relevance that each token has on another token. The tokenized code representation can be, for example, an optimized tensor of static code including variable names and comments for each code segment.

In examples, tokenization enables a breakdown of full source code into multiple fixed-sized chunks to be independently analyzed. Each fixed size chunk is thoroughly optimized in size by removing redundant code structures and encoding into an optimized tensor while still maintaining the overall contextual information. A translator of the LPTE module 106 converts the language tokens into tensors. In examples, each language token is mapped to a unique integer using a predefined vocabulary built from training data used to pre-train the parallel LLMs. The integer representations of tokens are then converted into dense vectors that capture the semantic meaning of the tokens in a continuous vector space. The dense vectors represent embeddings that are combined to form tensors.

In some embodiments, the present systems and techniques automatically detect vulnerabilities within source code and generates alternative code, without human intervention, by automatically generating tensors and distributing the tensors across parallel LLMs and generative AI. In some embodiments, the generated alternative source code is automatically injected into the alternative code, and the modified source code is executed. For example, a tensor is generated as follows, assuming the following simple C program source code is routed for analysis by the queuing module 102.

```
======================
#include <stdio.h>
int main( ) {
   // used to print a string
   printf("Hello, World!");
   return 0;
}
=====================
```

The code will be tokenized into the following unique tokens on each line:

#include—preprocessor directive
<stdio.h>—header file
int—keyword
main—identifier
( )—parenthesis
{—opening curly brace
// . . . —comment
printf—function
"Hello, World!"—string literal
; —semicolon
return—keyword
0—integer literal
}—closing curly brace Then each unique token will be encoded by an optimizer using a byte-pair encoding (BPE) algorithm of a natural language processing model. In examples, the natural language processing model is a language-neutral, platform-neutral, extensible mechanism for serializing structured data. In examples, the data is compressed by replacing the most frequent pair of bytes in a sequence with a single, unused byte.

For example, consider the input of: xxxyzxxxyzz. Since the byte-pair "xx" occurs most frequently, it is replaced with "A", so it becomes: AxyAxyzz. A replacement table is created to keep track of changes for reversal: A=xx. Then the process is repeated, since "xy" is most frequently occurring, the updated data looks like: ABABzz; where A=xx and B=xy. Then the encoded string of ABABzz is converted to numerical value using UTF-8 encoding generate unique token-IDs as follows: [1085, 366, 10558, 870, 397, 396, 1925, 368, 341, 322, 1511, 311, 1194, 264, 925, 198, 2578, 446, 9906, 11, 4435, 11390, 693, 220, 15, 280, 92]. The unique token-IDs are then assigned to randomly initialized n-dimensional vectors. The following are examples of a randomly generated 8-dimensional vector for the above unique IDs:

[10558,396,925,11,4435,366,1194,198]

[366,1925,10558,446,11390,264,2578,397]

[1925,4435,311,10558,366,11,198,280].

Subsequently a tensor is created by stacking the n-dimensional vectors together in a 3D array. For example, the vectors can be converted into the following tensor:

Tensor = [

[10558, 396, 925, 11, 4435, 366, 1194, 198]

[366, 1925, 10558, 446, 11390, 264, 2578, 397]

[1925, 4435, 311, 10558, 336, 11, 198, 280]

]

This tensor has a shape of 3×8, where 3 represents the number of vectors and 8 represents the dimensionality of each vector.

An optimizer of the LPTE module 106 obtains tensors generated by the LPTE module 106 and applies respective layer normalization and activation functions. The optimizer includes a multi-layer encoder. The optimizer transforms the prior tensor data to be on a comparable scale. This is done by obtaining the mean from each value and dividing by its standard deviation. An activation function takes the output from the normalization step and applies a rectified linear unit (ReLU) function. This mitigates any potential occurrence of the vanishing gradient problem in which the gradient magnitude significantly decreases or increases, causing performance issues in the training process.

In examples, each layer of the encoder stack of the optimizer consists of a (1) multi-headed attention mechanism—used input different parts of the source data and consider different interpretations of the data in parallel and (2) a position-wise feed forward network—a neural network that applies linear transformations to each position of input data. This enables refinement to the output (e.g., tensors) from the aforementioned attention mechanism. The multiple layers enables each layer to maintain different weights from one layer to the next to learn different aspects of the source data, such that the parameters (weights and biases) of the data are independently learned. This improves capturing of complex patterns in the source data.

Conventionally, LLMs have a limited context window such that they are unable to ingest the entire source code file in a single prompt and unable to efficiently and accurately perform summarization and analysis. The LPTE module 106 converts the original source code into an optimized tensor consisting of vector-embeddings. The optimized tensor is a vector representation of an array of scalar numbers. This vector captures the valid language constructs for the respective programming language that are part of its syntactic grammar and semantics. The entire decompiled source code is taken in as a long stream of strings which are subsequently broken down (tokenized) into categories of words and sub-words based on the represented programming language (e.g., JavaScript, Python, C, C++, etc.) which are then encoded into vectors.

The aforementioned processes utilize a customized approach that is based on a combination of two deep learning techniques where the LPTE module executes via: (1) a transformer model that uses a self-attention mechanism, positional encoding, and an encoder/decoder architecture and (2) a bi-directional long short-memory which can process data in both forward and backward directions, allowing it to capture both future and prior context from the input sequence.

A vulnerability detection model 108 includes trained parallel LLMs and trained generative AI modules. In examples, the trained parallel LLMs identify potential code vulnerabilities, and the trained generative AI modules generate alternative replacement code that fixes the vulnerabilities. The tensors generated by the LPTE module 106 are input to the trained parallel LLMs and generative AI modules, which process the tensors to automatically identify, decipher, and highlight potential vulnerable functions 114 within the static code and also propose potential proof of concept exploit code to test and validate the vulnerability identified.

In examples, to distribute the tensors across multiple LLMs the present systems and techniques relies on tensor parallelism, which involves dynamically partitioning the tensors of shape (B, D), where B indicates the batch size and D indicates the dimension, to be split along the D dimension by a factor, denoted as P. This factor is determined by the total number of worker nodes (i.e., physical devices running large-language models). The total number of worker nodes is determined by the total resource requirements in processing data. Instead of each worker node processing the same partition of the tensor at every step, the tensor alternates between worker nodes such that at each stage of computation, a different worker node handles a different chunk of the tensor.

This approach proves to offer a more balanced approach by preventing bottlenecks, reduces communication overhead between worker nodes, and improves overall scalability since the internal mechanism distributes the computational load more evenly and prevents memory duplication of inputs being copied across multiple worker nodes. As a result, the overall functioning of a computer is improved according to the present techniques.

In order to identify the separate chunks, each n-th chunk will contain a start and end indices that identify that part of the original tensor it corresponds to. In the above example, for a tensor split along the dimension D, each chunk can carry information about its starting and ending indices within that dimension. Furthermore, each chunk can be tagged with a unique worker-node identifier. This is used with communication, concatenation and recombination of the matrix multiplication results. In examples, high speed interconnects are used to enable high performance interconnections to re-gather all tensor chunks using a process known as all-gather to reform the original tensor shape. For example, a high speed interconnect forms a framework that enables fast communication between (1) multiple GPUs, (2) multiple CPUs, or (3) between GPUs and CPUs. In some embodiments, the vulnerability detection module 108 is a transformer based deep learning framework consisting of an array of parallel LLMs and generative AI modules that are pre-trained against a large dataset of vulnerable software.

The decoder-only and encoder-decoder LLMs are internal components within the Vulnerability Detection Module. Decoder-only LLMs include, for example, CodeGPT, Codex, Copilot, Code Llama, GPT 3.5/GPT4, etc. Encoder-decoder LLMs include, for example, T5, CodeT5, Gemini, etc. In examples, a decoder-only LLM is trained to predict the next word in a sequence and accurately generalizes to new tasks without additional training, referred to as zero-shot generalization. Decoder-only architectures enable efficient and accurate performance due to simplicity, good zero and few-shot generalization, and cheaper training costs. Combining decoder-only LLMs with encoder-decoder LLMs would enables improved performance from the decoder-only (causal decoder) models and the improved accuracy from use of encoder-decoder models.

The optimized tensors are stored and indexed internally in a vector database within the vulnerability and detection module 108. The vector database can be optimized for storage of massive quantities of vector embeddings and its ability to perform fast queries for retrieval. Each relevant tensor is tagged to identify it as part of the original source code stream with a unique identifier and split into smaller sized fixed chunks. In examples, a unique random 128-bit number is generated to tag the tensor. In its canonical textual representation, the 16 octets of the tag are represented as 32 hexadecimal digits, displayed in five groups separated by hyphens (e.g., ea78alfa-dbd7-4e7f-8d0d-995ac88de5da). This hexadecimal string is referred to as the origin-source-code-id and is associated with each source code file and is included with the respective tensor to tie it back to the original source code.

The vulnerability detection module uses a retrieval augmentation and dynamic few-shot prompting technique, in which similarly labeled data samples from the training set are used to generate prompts for the array of LLMs to summarize the purpose of the submitted static code samples, identify any potential vulnerabilities and attack vectors, propose a potential proof of concept exploit code for offensive security validation, and suggest potential patches that could be applied to mitigate said vulnerabilities. In examples, retrieval augmentation refers to augmenting each of the partitioned chunks with metadata which identifies the starting and ending indices for that chunk. Furthermore, each chunk contains a unique identifier (128-bit number or 32 hexadecimal digit) that is referred to as the origin-source-code-id to map it back to the worker node or model that is processing it at that given time. Using high-performance interconnects between worker nodes, the segmented chunks can be gathered and recombined into the original tensor shape and content.

In examples, generated prompts are based on the input source programming language and are divided based on the major vulnerability types, such as Memory Management Vulnerabilities; Input Validation and Injection Vulnerabilities; Cryptographic Vulnerabilities; Access Control and Authentication Vulnerabilities; Race Condition and Concurrency Weaknesses; File and Resource Handling Vulnerabilities; Configuration and Environment Variable Vulnerabilities; Integer and Arithmetic Vulnerabilities; Pointer and Object Management Vulnerabilities; Side-Channel Vulnerabilities; Serialization and De-serialization Vulnerabilities; Insufficient Data Validation; API and Protocol Vulnerabilities; and the like.

In examples, for the C programming language and buffer overflow vulnerabilities (which fall under Memory Management Vulnerabilities), an example of a few-shot prompt generated according to the present techniques is as follows, with respective task of "provide analysis and identify potential buffer overflow vulnerabilities in the code segment below and give a secure alternative."

Example 1

```
----------
Insecure Code:
  ```c
  void vulnerable_function(char *input) {
  char buffer[10];
  strcpy(buffer, input);
  }
```

The code of Example 1 is vulnerable to a buffer overflow because strcpy does not check the size of the input, allowing more data to be copied into buffer than it can hold. The following is a secure alternative:

```
  Secure Alternative:
```c
void secure_function(char *input) {
char buffer[10];
strncpy(buffer, input, sizeof(buffer) - 1);
buffer[sizeof(buffer) - 1] = '\0'; // Ensure null termination
  }
```

In the secure alternative code, strncpy is used to limit the number of characters copied and explicitly ensure the buffer is null-terminated to prevent buffer overflows.

Example 2

```
----------
Insecure Code:
```c
void process_data(char *input) {
char buffer[20];
sprintf(buffer, "Data: %s", input);
}
```

The code of Example 2 is vulnerable to a buffer overflow due to the use of sprintf without bounds checking.

```
  Secure Alternative:
```c
void process_data_secure(char *input) {
char buffer[20];
snprintf(buffer, sizeof(buffer), "Data: %s", input);
}
```

In the secure alternative code, snprintf is used to limit the number of characters written to the buffer and avoid buffer overflows.

Example 3

```
```c
#include <stdio.h>
int main( ) {
```
```

-continued

```
        char buff[5];
        printf("Enter a message: ");
        gets(buff);
        printf("The entered message is %s", buff);
        return 0;
        }
```

The code of Example 3 contains a potential buffer overflow vulnerability due to the use of the unsafe gets function, which does not check the size of the input and can lead to writing beyond the allocated memory for buff. Here's an analysis and a secure alternative.

```
  Insecure Code:
"'c
#include <stdio.h>
int main( ) {
char buff[5]; // allocate memory for a character array of 5 characters
printf("Enter a message:");
gets(buff); // This is unsafe
printf("The entered message is: %s", buff);
return 0;
}
```

The function gets (buff) reads input from the user and stores it in the buffer buff, but it does not check the size of the input, which represents a vulnerability. If a user enters more than 4 characters (plus the null terminator), it will overflow the buffer and corrupt adjacent memory, leading to undefined behavior, crashes, or security vulnerabilities.

The get( ) function is inherently unsafe and has been deprecated in favor of safer alternatives like fgets( ), which allows you to specify the size of the buffer and prevent overflows. The following is secure alternative code.

```
  Secure Alternative:
"'c
#include <stdio.h>
int main( ) {
char buff[5]; // allocate memory for a character array of 5 characters
printf("Enter a message: ");
fgets(buff, sizeof(buff), stdin); // safer alternative to gets( )
printf("The entered message is: %s", buff);
return 0;
}
```

The fgets function allows a user to specify the size of the buffer (sizeof(buff)), ensuring that no more than 4 characters (plus the null terminator) are read into buff. This prevents buffer overflows by limiting input to the size of the allocated buffer. The fgets function also ensures that the input is null-terminated, and you can handle the newline character accordingly if needed. By replacing gets with fgets, the code is protected from buffer overflows while safely enabling user input.

Figure 2:
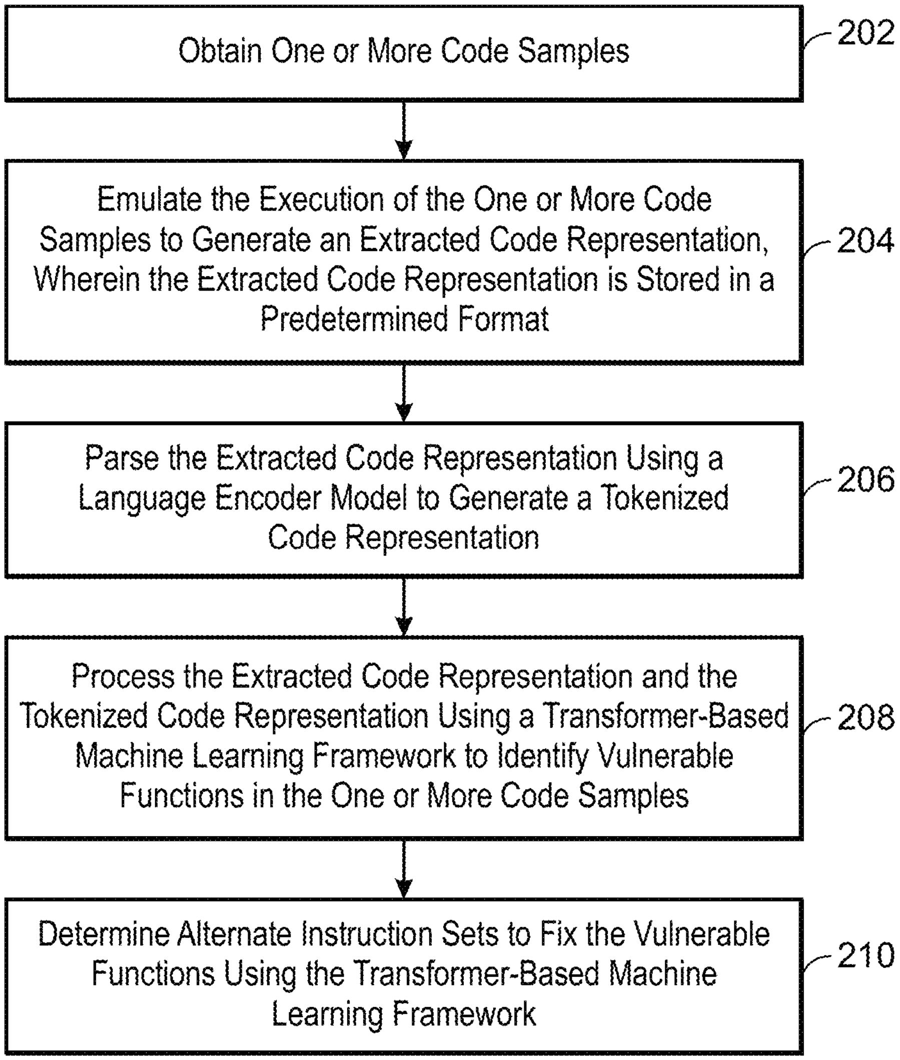
FIG. 2 is a process flow diagram of a process that enables. detection of software vulnerabilities utilizing machine learning.

FIG. 2 is a process flow diagram of a process 200 that enables detection of software vulnerabilities utilizing machine learning. For convenience, the process 500 will be described as being performed by a system.

At block 202, the system obtains one or more code samples.

The code samples can be for example, statically compiled code segments, dynamically compiled code segments, binary code segments, etc.

At block 204, the system emulates the execution of the one or more code samples to generate an extracted code representation. The extracted code representation can be stored in a predetermined format. In examples, the predetermined format is a proprietary tracing format selected as a function of the code language, semantics of the code, structured programming principles associated with the respective code, or any combinations thereof.

At block 206, the system parses the extracted code representation using a language encoder model to generate a tokenized code representation.

In some implementations, the system can divide the one or more code samples into a plurality of fixed-sized code segments. The system can process each code segment in the plurality of fixed-sized code segments to remove redundant code structures to generate a plurality of optimized code segments. The system can encode the plurality of optimized code segments to create a tensor.

At block 208, the system processes the extracted code representation and the tokenized code representation using a transformer-based machine learning framework to identify vulnerable functions in the one or more code samples. In some embodiments, the present systems and techniques automatically detect vulnerabilities within source code and proposes alternative code, without human intervention. In some embodiments, the present systems and techniques automatically inject the alternative code into the source code, and the modified source code is executed.

The transformer-based machine learning framework can, for example, include an array of parallel large language models and a generative AI module. In some examples, the transformer-based machine learning model is trained using domain-specific pre-training on identifying vulnerabilities for a specific weakness across the parallel large language models.

In some implementations, the system can encode the extracted code representation and the tokenized code representation to create a tensor and process the tensor using the transformer-based machine learning framework. The tensor can include, for example, function names, variable names, data types, comments for each code segment, or any combination thereof.

At block 210, the system determines alternative instruction sets to fix the vulnerable functions using the transformer-based machine learning framework.

In some implementations, the system can use the transformer-based machine learning framework to generate potential exploit code for the vulnerable functions. In examples, potential exploit code refers to code that can identify flaws, bypass security measures, gain unauthorized access to systems, take control of systems, and steal sensitive data. Security researchers can use potential exploit code as proof-of-concept threats.

Figure 3:
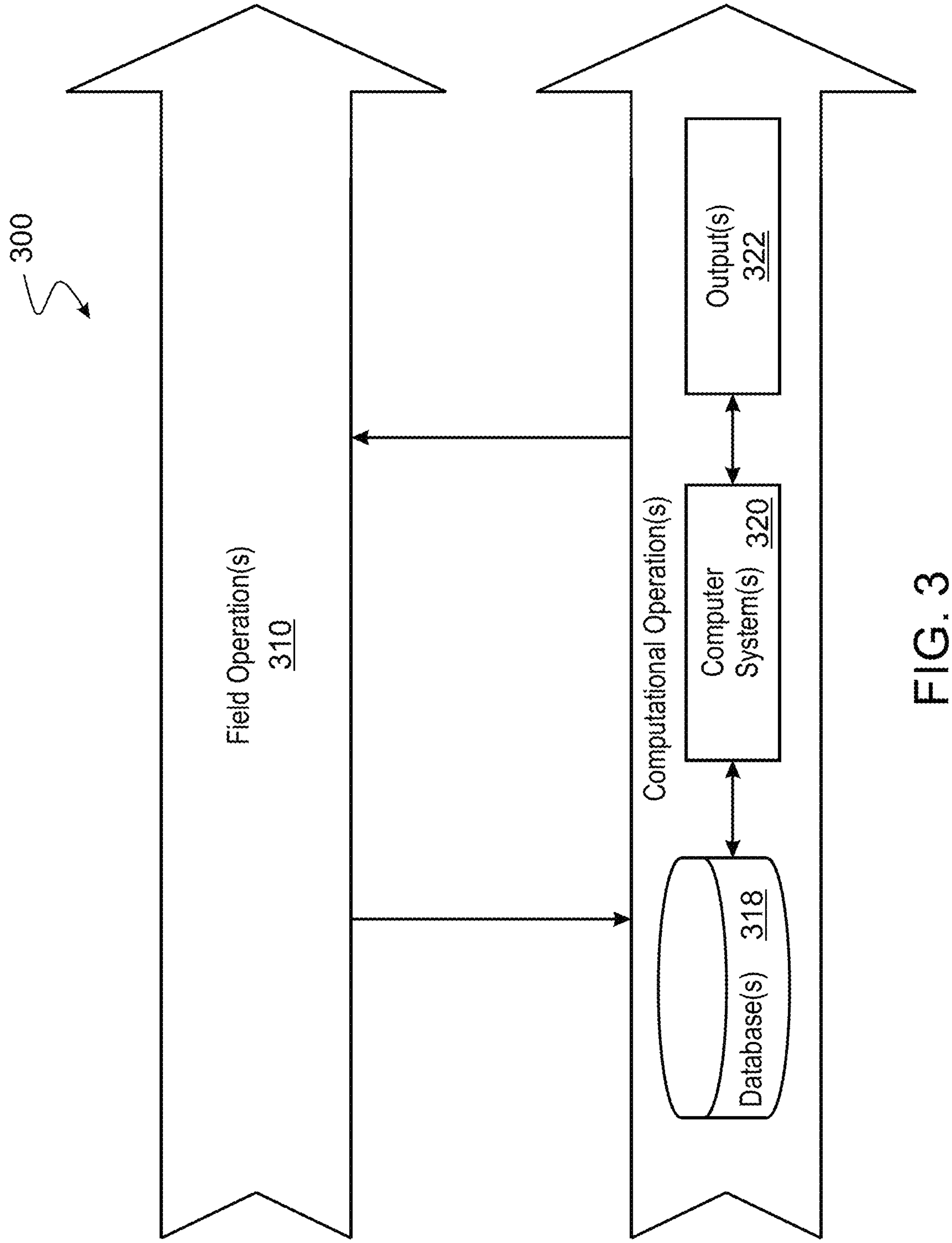
FIG. 3 illustrates hydrocarbon production operations that include both one or more field operations and one or more computational operations, which exchange information and control exploration for the production of hydrocarbons.

FIG. 3 illustrates hydrocarbon production operations 300 that include both one or more field operations 310 and one or more computational operations 312, which exchange information and control exploration for the production of hydrocarbons. In some implementations, outputs of techniques of the present disclosure can be performed before, during, or in combination with the hydrocarbon production operations 300, specifically, for example, either as field operations 310 or computational operations 312, or both. In examples, the detection of vulnerabilities as described herein is applied to code associated with field operations 310, computational operations 312, or both.

Examples of field operations 310 include forming/drilling a wellbore, hydraulic fracturing, producing through the wellbore, injecting fluids (such as water) through the wellbore, to name a few. In some implementations, methods of the present disclosure can trigger or control the field operations 310. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 310 and responsively triggering the field operations 310 including, for example, generating plans and signals that provide feedback to and control physical components of the field operations 310. Alternatively or in addition, the field operations 310 can trigger the methods of the present disclosure. For example, implementing physical components (including, for example, hardware, such as sensors) deployed in the field operations 310 can generate plans and signals that can be provided as input or feedback (or both) to the methods of the present disclosure.

Examples of computational operations 312 include one or more computer systems 320 that include one or more processors and computer-readable media (e.g., non-transitory computer-readable media) operatively coupled to the one or more processors to execute computer operations to perform the methods of the present disclosure. The computational operations 312 can be implemented using one or more databases 318, which store data received from the field operations 310 and/or generated internally within the computational operations 312 (e.g., by implementing the methods of the present disclosure) or both. For example, the one or more computer systems 320 process inputs from the field operations 310 to assess conditions in the physical world, the outputs of which are stored in the databases 318. For example, seismic sensors of the field operations 310 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 312 where they are stored in the databases 318 and analyzed by the one or more computer systems 320.

In some implementations, one or more outputs 322 generated by the one or more computer systems 320 can be provided as feedback/input to the field operations 310 (either as direct input or stored in the databases 318). The field operations 310 can use the feedback/input to control physical components used to perform the field operations 310 in the real world.

For example, the computational operations 312 can process the seismic data to generate three-dimensional (3D) maps of the subsurface formation. The computational operations 312 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 312 to process new information about the formation and control the drilling to adjust to the observed conditions in real-time.

The one or more computer systems 320 can update the 3D maps of the subsurface formation as information from one exploration well is received and the computational operations 312 can adjust the location of the next exploration well based on the updated 3D maps. Similarly, the data received from production operations can be used by the computational operations 312 to control components of the production operations. For example, production well and pipeline data can be analyzed to predict slugging in pipelines leading to a refinery and the computational operations 312 can control machine operated valves upstream of the refinery to reduce the likelihood of plant disruptions that run the risk of taking the plant offline.

In some implementations of the computational operations 312, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 4:
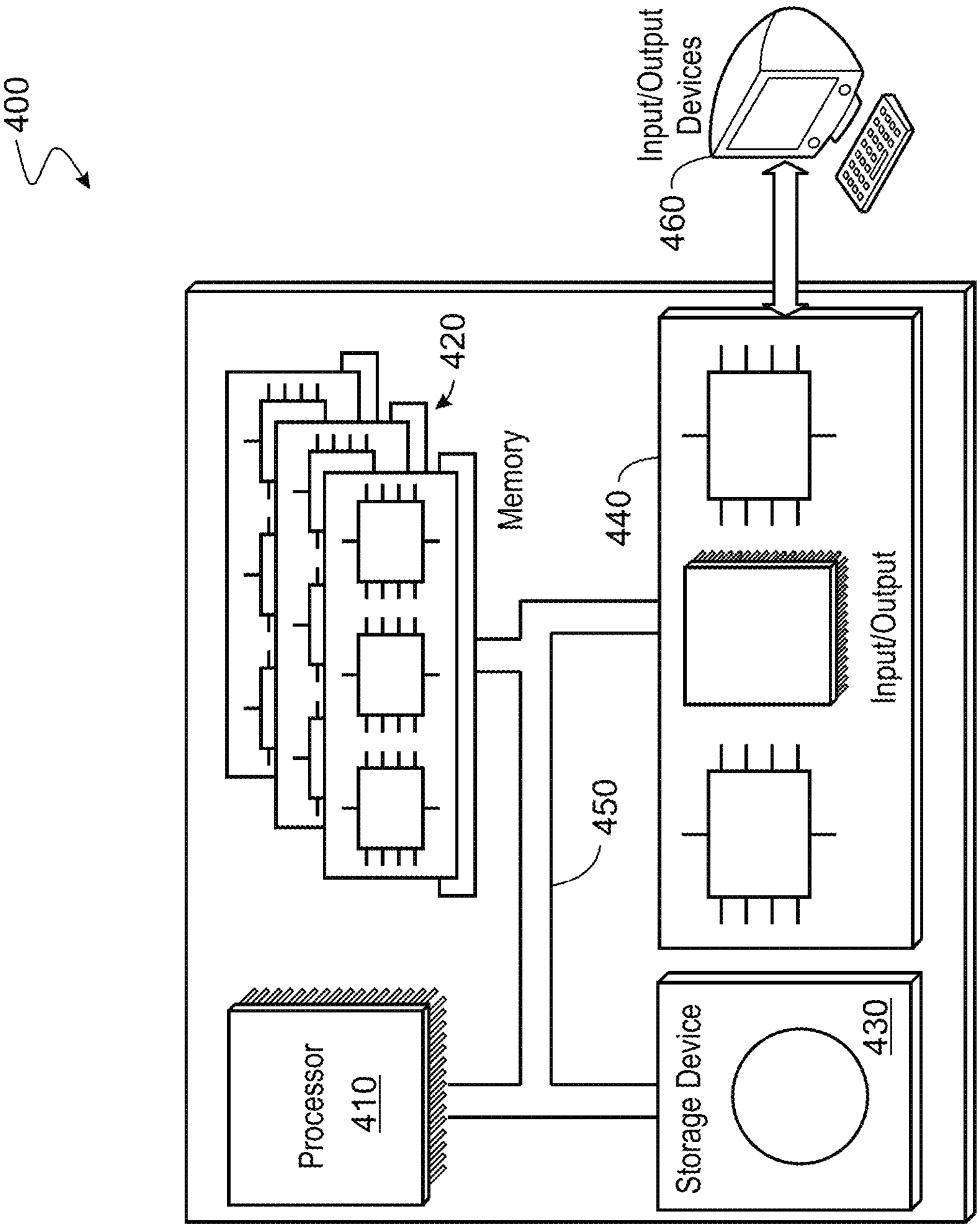
FIG. 4 is a schematic illustration of an example controller (or control system) for that enables detection of software vulnerabilities utilizing machine learning.

FIG. 4 is a schematic illustration of an example controller 400 (or control system) for that enables detection of software vulnerabilities utilizing machine learning. For example, the controller 400 may be operable according to the workflow 100 of FIG. 1 or the process 200 of FIG. 2. In some embodiments, the controller 400 is the same as or similar to the computer systems 320 of FIG. 3. The controller 400 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output interface 440 communicatively coupled with input/output devices 460 (for example, displays, keyboards, measurement devices, sensors, valves, pumps). Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output interface 440.

The memory 420 stores information within the controller 400. In one implementation, the memory 420 is a computer-readable medium. In one implementation, the memory 420 is a volatile memory unit. In another implementation, the memory 420 is a nonvolatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output interface 440 provides input/output operations for the controller 400. In one implementation, the input/output devices 460 includes a keyboard and/or pointing device. In another implementation, the input/output devices 460 includes a display unit for displaying graphical user interfaces.

There can be any number of controllers 400 associated with, or external to, a computer system containing controller 400, with each controller 400 communicating over a network. Further, the terms "client," "user," and other appropriate terminology can be used interchangeably, as appropriate, without departing from the scope of the present disclosure. Moreover, the present disclosure contemplates that many users can use one controller 400 and one user can use multiple controllers 400.

EMBODIMENTS

According to some non-limiting embodiments or examples, provided is a computer-implemented method that enables detection of software vulnerabilities utilizing machine learning, including: emulating execution of one or more code samples to generate an extracted code representation, wherein the extracted code representation is stored in a predetermined format; parsing the extracted code representation using a language encoder model to generate a tokenized code representation; processing the extracted code representation and the tokenized code representation using a transformer-based machine learning framework to identify vulnerable functions in the one or more code samples; and determining alternative instruction sets to fix the vulnerable functions using the transformer-based machine learning framework.

According to some non-limiting embodiments or examples, provided is an apparatus including a non-transitory, computer readable, storage medium that stores instructions that, when executed by at least one processor, cause the at least one processor to perform operations including: emulating execution of one or more code samples to generate an extracted code representation; parsing the extracted code representation using a language encoder model to generate a tokenized code representation; processing the extracted code representation and the tokenized code representation using a transformer-based machine learning framework to identify vulnerable functions in the one or more code samples; and determining alternative code suggestions to fix the vulnerable functions using the transformer-based machine learning framework.

According to some non-limiting embodiments or examples, provided is a system, including: one or more memory modules; one or more hardware processors communicably coupled to the one or more memory modules, the one or more hardware processors configured to execute instructions stored on the one or more memory modules to perform operations including: emulating execution of one or more code samples to generate an extracted code representation; parsing the extracted code representation using a language encoder model to generate a tokenized code representation; processing the extracted code representation and the tokenized code representation using a transformer-based machine learning framework to identify vulnerable functions in the one or more code samples; and determining alternative code suggestions to fix the vulnerable functions using the transformer-based machine learning framework.

Further non-limiting aspects or embodiments are set forth in the following numbered embodiments:

Embodiment 1: A computer-implemented method that enables detection of software vulnerabilities utilizing machine learning, including: emulating execution of one or more code samples to generate an extracted code representation, wherein the extracted code representation is stored in a predetermined format; parsing the extracted code representation using a language encoder model to generate a tokenized code representation; processing the extracted code representation and the tokenized code representation using a transformer-based machine learning framework to identify vulnerable functions in the one or more code samples; and determining alternative instruction sets to fix the vulnerable functions using the transformer-based machine learning framework.

Embodiment 2: The computer implemented method of any preceding embodiment, wherein the transformer-based machine learning framework includes an array of parallel large language models and a generative artificial intelligence module.

Embodiment 3: The computer implemented method of any preceding embodiment, wherein the method further includes using the transformer-based machine learning framework to generate potential exploit code for the vulnerable functions.

Embodiment 4: The computer implemented method of any preceding embodiment, wherein processing the extracted code representation and the tokenized code representation using a transformer-based machine learning framework to identify vulnerable functions in the one or more code samples includes: encoding the extracted code representation and the tokenized code representation to create a tensor; and processing the tensor using the transformer-based machine learning framework.

Embodiment 5: The computer implemented method of any preceding embodiment, wherein the tensor includes (i) function names, (ii) variable names (iii) data types, (iii) comments for each code segment, or any combination thereof.

Embodiment 6: The computer implemented method of any preceding embodiment, wherein the transformer-based machine learning model is trained using domain-specific pre-training on identifying vulnerabilities for a specific weakness across parallel large language models of the transformer-based machine learning framework.

Embodiment 7: The computer implemented method of any preceding embodiment, wherein parsing the extracted code representation using a language encoder model to generate a tokenized code representation includes: dividing the one or more code samples into a plurality of fixed-sized code segments; processing each code segment in the plurality of fixed-sized code segments to remove redundant code structures to generate a plurality of optimized code segments; and encoding the plurality of optimized code segments to create the tensor.

Embodiment 8: An apparatus including a non-transitory, computer readable, storage medium that stores instructions that, when executed by at least one processor, cause the at least one processor to perform operations including: emulating execution of one or more code samples to generate an extracted code representation; parsing the extracted code representation using a language encoder model to generate a tokenized code representation; processing the extracted code representation and the tokenized code representation using a transformer-based machine learning framework to identify vulnerable functions in the one or more code samples; and determining alternative code suggestions to fix the vulnerable functions using the transformer-based machine learning framework.

Embodiment 9: The apparatus of any preceding embodiment, wherein the transformer-based machine learning framework includes an array of parallel large language models and a generative artificial intelligence module.

Embodiment 10: The apparatus of any preceding embodiment, wherein the operations further include using the transformer-based machine learning framework to generate potential exploit code for the vulnerable functions.

Embodiment 11: The apparatus of any preceding embodiment, wherein processing, the extracted code representation and the tokenized code representation using a transformer-based machine learning framework to identify vulnerable functions in the one or more code samples includes: encoding the extracted code representation and the tokenized code representation to create a tensor; and processing the tensor using the transformer-based machine learning framework.

Embodiment 12: The apparatus of any preceding embodiment, wherein the tensor includes (i) function names, (ii) variable names, (iii) data types, (iii) comments for each code segment, or any combination thereof.

Embodiment 13: The apparatus of any preceding embodiment, wherein the transformer-based machine learning model is trained using domain-specific pre-training on identifying vulnerabilities for a specific weakness across parallel large language models of the transformer-based machine learning framework.

Embodiment 14: The apparatus of any preceding embodiment, wherein parsing the extracted code representation using a language encoder model to generate a tokenized code representation includes: dividing the one or more code samples into a plurality of fixed-sized code segments; processing each code segment in the plurality of fixed-sized code segments to remove redundant code structures to generate a plurality of optimized code segments; and encoding the plurality of optimized code segments to create the tensor.

Embodiment 15: A system, including: one or more memory modules;

one or more hardware processors communicably coupled to the one or more memory modules, the one or more hardware processors configured to execute instructions stored on the one or more memory modules to perform operations including: emulating execution of one or more code samples to generate an extracted code representation; parsing the extracted code representation using a language encoder model to generate a tokenized code representation; processing the extracted code representation and the tokenized code representation using a transformer-based machine learning framework to identify vulnerable functions in the one or more code samples; and determining alternative code suggestions to fix the vulnerable functions using the transformer-based machine learning framework.

Embodiment 16: The system of any preceding embodiment, wherein the transformer-based machine learning framework includes an array of parallel large language models and a generative AI module.

Embodiment 17: The system of any preceding embodiment, wherein the operations further include using the transformer-based machine learning framework to generate potential exploit code for the vulnerable functions.

Embodiment 18: The system of any preceding embodiment, wherein processing, the extracted code representation and the tokenized code representation using a transformer-based machine learning framework to identify vulnerable functions in the one or more code samples includes: encoding the extracted code representation and the tokenized code representation to create a tensor; and processing the tensor using the transformer-based machine learning framework.

Embodiment 19: The system of any preceding embodiment, wherein the tensor includes (i) function names, (ii) variable names, (iii) data types, (iii) comments for each code segment, or any combination thereof.

Embodiment 20: The system of any preceding embodiment, wherein parsing, using at the least one hardware processor, the extracted code representation using a language encoder model to generate a tokenized code representation includes: dividing the one or more code samples into a plurality of fixed-sized code segments; processing each code segment in the plurality of fixed-sized code segments to remove redundant code structures to generate a plurality of optimized code segments; and encoding the plurality of optimized code segments to create the tensor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products. Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method that enables detection of software vulnerabilities utilizing machine learning, comprising:

- emulating execution of one or more code samples to generate an extracted code representation, wherein the extracted code representation is stored in a predetermined format;
- parsing the extracted code representation using a language encoder model to generate a tokenized code representation;
- processing the extracted code representation and the tokenized code representation using a transformer-based machine learning framework to identify vulnerable functions in the one or more code samples, wherein processing the extracted code representation and the tokenized code representation comprises:
  - encoding the extracted code representation and the tokenized code representation to create a tensor; and
  - processing the tensor using the transformer-based machine learning framework; and
- determining alternative instruction sets to fix the vulnerable functions using the transformer-based machine learning framework.

2. The computer implemented method of claim 1, wherein the transformer-based machine learning framework comprises an array of parallel large language models and a generative artificial intelligence module.

3. The computer implemented method of claim 1, wherein the method further comprises using the transformer-based machine learning framework to generate potential exploit code for the vulnerable functions.

4. The computer implemented method of claim 1, wherein the tensor comprises (i) function names, (ii) variable names (iii) data types, (iii) comments for each code segment, or any combination thereof.

5. The computer implemented method of claim 2, wherein the transformer-based machine learning model is trained using domain-specific pre-training on identifying vulnerabilities for a specific weakness across parallel large language models of the transformer-based machine learning framework.

6. The computer implemented method of claim 1, wherein parsing the extracted code representation using a language encoder model to generate a tokenized code representation comprises:

- dividing the one or more code samples into a plurality of fixed-sized code segments;
- processing each code segment in the plurality of fixed-sized code segments to remove redundant code structures to generate a plurality of optimized code segments; and
- encoding the plurality of optimized code segments to create the tensor.

7. An apparatus comprising a non-transitory, computer readable, storage medium that stores instructions that, when executed by at least one processor, cause the at least one processor to perform operations comprising:

emulating execution of one or more code samples to generate an extracted code representation;

parsing the extracted code representation using a language encoder model to generate a tokenized code representation;

processing the extracted code representation and the tokenized code representation using a transformer-based machine learning framework to identify vulnerable functions in the one or more code samples, wherein processing the extracted code representation and the tokenized code representation comprises:

encoding the extracted code representation and the tokenized code representation to create a tensor; and processing the tensor using the transformer-based machine learning framework; and determining alternative code suggestions to fix the vulnerable functions using the transformer-based machine learning framework.

8. The apparatus of claim 7, wherein the transformer-based machine learning framework comprises an array of parallel large language models and a generative artificial intelligence module.

9. The apparatus of claim 7, wherein the operations further comprise using the transformer-based machine learning framework to generate potential exploit code for the vulnerable functions.

10. The apparatus of claim 7, wherein the tensor comprises (i) function names, (ii) variable names, (iii) data types, (iii) comments for each code segment, or any combination thereof.

11. The apparatus of claim 7, wherein the transformer-based machine learning model is trained using domain-specific pre-training on identifying vulnerabilities for a specific weakness across parallel large language models of the transformer-based machine learning framework.

12. The apparatus of claim 7, wherein parsing the extracted code representation using a language encoder model to generate a tokenized code representation comprises:

dividing the one or more code samples into a plurality of fixed-sized code segments;

processing each code segment in the plurality of fixed-sized code segments to remove redundant code structures to generate a plurality of optimized code segments; and encoding the plurality of optimized code segments to create the tensor.

13. A system, comprising:

one or more memory modules;

one or more hardware processors communicably coupled to the one or more memory modules, the one or more hardware processors configured to execute instructions stored on the one or more memory modules to perform operations comprising:

emulating execution of one or more code samples to generate an extracted code representation;

parsing the extracted code representation using a language encoder model to generate a tokenized code representation;

processing the extracted code representation and the tokenized code representation using a transformer-based machine learning framework to identify vulnerable functions in the one or more code samples, wherein processing the extracted code representation and the tokenized code representation comprises:

encoding the extracted code representation and the tokenized code representation to create a tensor; and processing the tensor using the transformer-based machine learning framework; and determining alternative code suggestions to fix the vulnerable functions using the transformer-based machine learning framework.

14. The system of claim 13, wherein the transformer-based machine learning framework comprises an array of parallel large language models and a generative AI module.

15. The system of claim 13, wherein the operations further comprise using the transformer-based machine learning framework to generate potential exploit code for the vulnerable functions.

16. The system of claim 13, wherein the tensor comprises (i) function names, (ii) variable names, (iii) data types, (iii) comments for each code segment, or any combination thereof.

17. The system of claim 13, wherein parsing, using at the least one hardware processor, the extracted code representation using a language encoder model to generate a tokenized code representation comprises:

dividing the one or more code samples into a plurality of fixed-sized code segments;

processing each code segment in the plurality of fixed-sized code segments to remove redundant code structures to generate a plurality of optimized code segments; and encoding the plurality of optimized code segments to create the tensor.

* * * * *